(12) United States Patent
Zaguliaev et al.

(10) Patent No.: US 11,266,995 B2
(45) Date of Patent: Mar. 8, 2022

(54) METHOD AND APPARATUS FOR ROCK DISINTEGRATION

(71) Applicants: Victor Zaguliaev, Richmond Hill (CA); Nikolai Novikov, Maple (CA)

(72) Inventors: Victor Zaguliaev, Richmond Hill (CA); Nikolai Novikov, Maple (CA)

(73) Assignee: 2207449 Ontario Inc

( * ) Notice: Subject to any disclaimer, the term of this patent is extended or adjusted under 35 U.S.C. 154(b) by 324 days.

(21) Appl. No.: 16/602,051

(22) Filed: Jul. 29, 2019

(65) Prior Publication Data

US 2019/0351426 A1    Nov. 21, 2019

Related U.S. Application Data

(62) Division of application No. 15/530,730, filed on Feb. 22, 2017, now Pat. No. 10,421,079.

(51) Int. Cl.
| | |
|---|---|
| *B02C 19/18* | (2006.01) |
| *B02C 19/00* | (2006.01) |
| *B02C 23/38* | (2006.01) |
| *B02C 23/18* | (2006.01) |

(52) U.S. Cl.
CPC ...... *B02C 19/0043* (2013.01); *B02C 19/0012* (2013.01); *B02C 19/0018* (2013.01); *B02C 19/18* (2013.01); *B02C 23/18* (2013.01); *B02C 23/38* (2013.01); *B02C 2019/183* (2013.01)

(58) Field of Classification Search
CPC .... B02C 19/18; B02C 2019/183; B02C 23/38
USPC ............................................. 241/1, 29
See application file for complete search history.

(56) References Cited

U.S. PATENT DOCUMENTS

| | | | | | |
|---|---|---|---|---|---|
| 3,811,623 | A | * | 5/1974 | Speer ................... | B02C 19/18 241/1 |
| 4,126,275 | A | * | 11/1978 | Timberlake ........... | C01B 25/01 241/1 |
| 4,313,573 | A | * | 2/1982 | Goldberger .......... | B02C 19/18 241/1 |
| 5,577,669 | A | * | 11/1996 | Vujnovic .............. | C10L 9/00 241/1 |
| 6,824,086 | B1 | * | 11/2004 | Mazurkiewicz ...... | B02C 19/06 241/152.2 |
| 2006/0086646 | A1 | * | 4/2006 | Patist .................... | B03D 1/021 209/164 |

* cited by examiner

*Primary Examiner* — Faye Francis
(74) *Attorney, Agent, or Firm* — David W. Wong

(57) ABSTRACT

Ore rock is disintegrated into extremely fine rock fraction in a slurry by subjecting the slurry in selective orders of application of excitation forces and energy to cause spontaneous cavitation to occur in the slurry. The excitation forces and energy are provided by electrodynamic discharges, hydrostatic force, hydrodynamic energy, and sonic vibrations.

8 Claims, 1 Drawing Sheet

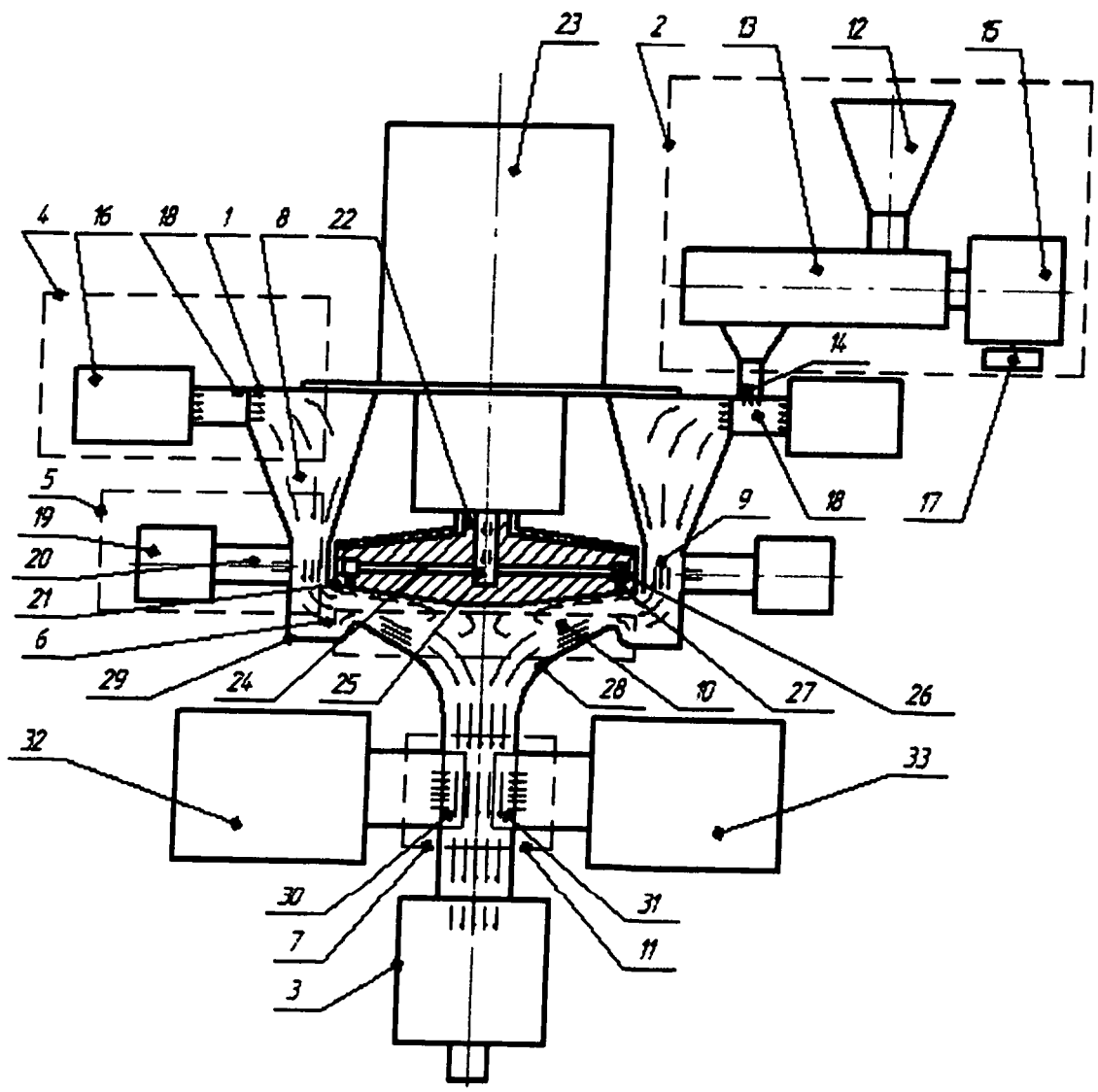

METHOD AND APPARATUS FOR ROCK DISINTEGRATION

FIELD OF THE INVENTION

This invention relates to a method and apparatus for crushing, and disintegrating of solid ore rock into fine aggregate particularly in the mining industry to facilitate high efficiency mineral recovery and refinery processes to be carried out.

BACKGROUND OF ART

In the mining industry, it is necessary initially to crush the raw ore rock to reduce the rock size in order that it may be used for mineral recovery and refinery processes. Heretofore, mechanical means such as mechanical crushers or mills are commonly employed for such purposes. However, the crushed rock particles obtained by mechanical means have far too large and often uneven sizes so that it is not suitable for subsequent mineral refinery processes to be carried out with satisfactory efficiency. For carrying out mineral recovery and refinery processes with satisfactory efficiency it is necessary to crush the ore rock to finer than at least 40 microns which cannot be achieved with mechanical means without employing complex methods that would incur highly prohibitive costs. Furthermore, mechanical crushers in particular are prone to jamming either of their moving parts or even by the ore rock being crushed, and their crushing component parts are subject to high degree of wear rendering further unsatisfactory crushing operation and unnecessary down time of the entire mining operation.

SUMMARY OF THE INVENTION

The principal object of the present invention is to provide a method and apparatus for disintegrating ore rock into an aggregate having extremely fine rock particle sizes dispersed in a slurry so as to facilitate mineral recovery and refinery processes to be carried out with high efficiency.

It is another object of the present invention to provide a method and apparatus for disintegrating ore rock by subjecting the ore rock to a series of consecutive application of excitation forces and energy to break down the ore rock thoroughly to an aggregate having dispersed rock particles of extremely fine physical size so that highly efficient mineral recovery and refinery processes can be carried out.

It is another object of the present invention to provide a method of subjecting the ore rock in a continuous process to a series of electro-hydrodynamic, hydrostatic, hydrodynamic, and hydro-sonic operations to cause the ore rock to disintegrate by spontaneous cavitation into an aggregate having extremely fine rock particles dispersed therein.

It is yet another object of the present invention to provide a method of disintegrating ore rock to finer than 1 micron in sizes so as to facilitate high efficiency subsequent mineral recovery and refinery processes to be carried out.

It is yet still another object of the present invention to provide a continuous method of disintegrating ore rock, which is relatively easy to operate.

The method of the present invention is conducted by subjecting a slurry of the mixture of the ore rock with water to a series of excitation forces and energy provided by electro-hydrodynamic, hydrostatic, hydrodynamic, and hydro-sonic operations. Various orders and sequence of application of such excitation forces and energy may be carried out to cause the ore rock to disintegrate spontaneously into extremely fine rock particles.

An exemplary embodiment of the method of the present invention can be carried out in a continuous sequential process in which a slurry consisting of the mixture of ore rock and water is subjected to electrical discharges in a first stage to create excitation of shockwaves and cavitation in the slurry for breaking down or disintegrating the physical size of the rock fraction. The slurry is then moved through a second stage in which the moving flow of slurry is subjected to hydrostatic agitation to cause further cavitation for disintegrating the rock fraction to further finer sizes. The slurry is then passed through a third stage in which it is exposed to a high speed cavitation flow of water in the direction of the slurry movement so as to cause the slurry to swirl thus disintegrating the rock fraction to still further finer sizes. Finally, in the fourth stage, the swirled slurry is exposed to sonic vibrations focusing in the para-axial zone of the slurry flow for disintegrating the rock fraction thoroughly into extremely fine sizes.

The apparatus for implementing the method, in the exemplary embodiment, comprises electro-hydrodynamic, hydrostatic, hydrodynamic, and hydro-sonic stages located in a successive sequence. The first stage comprises one or several electro-hydrodynamic discharge chambers in which the slurry is subjected to the electrical discharge. The second stage comprises at least two hydrostatic cavitation chambers with output channels that are perpendicular to the direction of the flow of slurry coming from the first stage. The third stage comprises a high speed disc, which contains radial channels inside the disc and the channels are connected to the source of water from one side and with nozzle edge channels in the peripheral part of the disc from the opposite side. The fourth stage comprises at least two sources of sonic vibrations each having a semi-cylindrical shape that forms the flow channel of the chamber's lateral surface.

The four stages of successive sequence of electro-hydrodynamic, hydrostatic, hydrodynamic, and hydro-sonic processes cause the treated rock fraction to be disintegrated thoroughly into extremely fine physical sizes and has desirable dispersion to facilitate high efficiency mineral recovery and finery processes to be carried out therewith. Furthermore, ore rock having a wide range of sizes are acceptable for inputting into the apparatus of the present invention for carrying out the method of rock disintegration.

DESCRIPTION OF THE DRAWING

Other objects of this invention will appear in the following description and appended claims, reference being made to the accompanying FIG. 1 of drawing showing a schematic block diagram of the apparatus for carrying out the method of the present invention for disintegrating rock.

DETAILED DESCRIPTION OF THE PREFERRED EMBODIMENTS

With reference to the drawing, showing the exemplary embodiment of the invention, the ore rock is delivered to a casing 1 by a loading unit 2 via a feeding control unit in the first stage of the apparatus of the present invention. One or a plurality of casings may be provided. Two casings 1 are shown as an exemplary embodiment. The final disintegrated substance is received in a final container 3. The first stage of the apparatus is shown by a broken line rectangular block 4. The second stage is shown by a broken line rectangular block 5. The third stage is shown by a broken line rectangular block 6. The final fourth stage is shown by a broken line rectangular block 7.

The casing 1 has a funnel-shaped chute having an inverted conical cavity 8 with a convergent lower end having a minimal cross sectional diameter. The lower end of the funnel-shaped chute is connected to a vertical cylindrical tubular section having a cylindrical cavity 9. The lower end of the vertical cylindrical cavity 9 extends into a radially converging nozzle channel 10 leading into a vertical cylindrical channel having a lateral surface 11.

The loading unit 2 includes a feeding hopper 12, a feeder 13 with an outlet fitting 14 connected to the casing 1. The delivery of the ore rock to the casing 1 is controlled by a control unit 15 having a drive means 17 such as an electrical drive motor.

In the first stage 4, one or several electro-hydrodynamic discharge chambers 16 are provided. The electro-hydrodynamic discharge chamber 16 has a tangential nozzle output channel 18 extending into the inverted conical cavity 8 of the funnel-shaped chute.

In the second stage 5, at least two hydrostatic cavitation chambers 19 are provided. The hydrostatic cavitation chamber 19 has an output channel 20 that is connected in a perpendicular manner to the vertical cylindrical tubular section having the cylindrical cavity 9.

The third stage 6 of the present apparatus consists of a hydro-dynamic device having a round disc 21 located in a downwardly converging channel 10. The disc 21 is rotatably mounted on a hollow cylindrical rotary shaft 22. The rotation of the shaft 22 may be powered by a high speed electric motor or a free turbine of a gas turbine power plant 23. A plurality of radial channels 24 are formed in the disc 21. The inner end of the radial channels 24 is connected to the rotary shaft 22 and they are in communication with the axial channel 25 of the rotary shaft 22. The outer end of the radial channels 24 is connected to an annular cavity 26 located in the peripheral edge portion of the disc 21. The annular cavity 26 is in communication with the downwardly converging channel 10 through a plurality of vertical nozzle channels 27 extending downward through the bottom surface of the disc 21. The downwardly converging channel 10 is bounded at the top by the bottom surface of the disc 21 and at the two lateral sides by the arcuate curve lateral surfaces 28. The arcuate curve lateral surfaces 28 are established by the Bernoulli's lemniscate rotation about a vertical axis that is an extension of the central rotary axis of the rotary shaft 22. The mating of the cylindrical cavity 9 and the downwardly converging channel 10 is provided by an annular edge indent 29 formed at the joint between the vertical cylindrical section of the cavity 9 and the top end of the arcuate curve lateral surfaces 28 of the downwardly converging channel 10.

The fourth stage 7 of the present apparatus is a hydro-cavitation stage which comprises at least two sources of sonic vibrations 30 and 31 applied in the lateral direction to the rock slurry flowing downward through the channel of a vertical cylindrical duct located below the downwardly converging channel 10. The sonic vibrations 30 and 31 are powered by sonic vibration generators 32 and 33.

The method of rock disintegration of the exemplary embodiment of the present invention is carried out by initially filling the cavities 8 and 9, and channel 10 with water. Ore rock is fed through the feeding hopper 12 to the loading unit 2 in which the ore rock is transported to the outlet fitting 14 by the drive means 15. Supply of the ore rock by the feeder 13 can be metered by varying the speed of the drive means, such as changing the speed of an electric drive motor of the drive means with a frequency regulator. The ore rock moves from the loading unit 2 into the tangential nozzle output channels 18 in which it is subjected to electrical discharges generated from one or several electro-dynamic discharge chambers 16. As a result, while the ore rock is mixing with the water in the inverted conical cavity 8, shock waves are created in the water by the electro-dynamic discharges to produce shock collision impact in the slurry so that cavitation effects occur in the slurry whereby the ore rock is crumbled as it mixes with the water to form a slurry of disintegrated rock particles and water. The resulted slurry is boosted by further shock collisions as it moves from the tangential nozzle channels 18 into the cavity 8 thus the crumbled rock particles are further disintegrated into still smaller physical size due to the further shock collisions in the cavity 8. The tangential injection of the slurry into the inverted conical cavity 8 creates a circular rotation motion within the slurry, which facilitates agitation of the slurry's components while protecting the opposite lateral wall surfaces of the cavity 8 from shock loads. Selective degree of dispersion and ratio of liquid and solid fraction in the slurry in the first stage can be obtained by varying the number of electro-dynamic discharges applied to the slurry as well as by the intensity of the circular rotation motion distribution of the slurry in the inverted conical cavity 8.

From the inverted conical cavity 8 of the first stage, the slurry moves into the annular cylindrical cavity 9 of the second stage 5 in which at least two hydrostatic cavitation chambers 19 are located. The hydrostatic cavitation chambers 19 have a plurality of output channels 20 that are orientated perpendicular to the lateral surface of the cylindrical cavity 9 such that hydrostatic agitation is imposed perpendicular to the direction of the slurry movement as the slurry is moving into the second stage 5. The slurry swirls in a circular distribution while it is being excited by hydrostatic power to cause further cavitation to occur. Thus the rock particles in the slurry is further disintegrated into more finer sizes.

Following the disintegration by hydrostatic cavitation in the second stage 5, the slurry is moved into the hydrodynamic system of the third stage 6 in which it is treated with a strong swirled flow coming into the converging nozzle channel 10. Water is brought into the axial channel 25 of the rotary shaft 22 at a low pressure while the round disc 21 is rotated either by a high speed electric motor 23 or by a free turbine of a gas turbine power plant. Under the action of centrifugal forces, the water acquires acceleration and, as the result, it creates high hydrostatic pressure in the annular cavity 26 of the vertical nozzle channels 27 inlet. At this point, water acquires the velocity equal to the nozzle's radial velocity. In the nozzle, the hydrostatic pressure is converted into kinetic energy, which produces the second component of the velocity. The resulting velocity of the slurry flow is obtained by a composition of two vectors and the design of the disc. For example, at the radial velocity of 700 msec when using the rotor, the speed of the slurry flow may be increased up to 1400 msec. With the nozzles located on the lateral surface of the round disc 21 so that the central axis of the nozzle channels 27 is parallel to the central axis of the rotary shaft 22, the working fluid velocity is 40% higher than the radial velocity. A fluid velocity of up to 1000 msec is achievable to produce a strong swirling movement in the slurry, which is sufficient to break any hard rock fraction still remaining in the slurry. The shape of the arcuate curve lateral surfaces 28 is formed by a surface gained by Bernoulli's lemniscate rotation about a continuation extension of the central axis of the rotary shaft 22. Such shape reduces any pressure loss in the slurry flow from the converging nozzle channel 10 to the vertical cylindrical channel in the following fourth stage 7 in the process.

In the fourth stage 7, the strongly swirled boosted flow of slurry from the third stage is further exposed to hydro-sonic vibration with the hydro-sonic power focusing in the para-axial zone of the slurry's swirled flow in the vertical cylindrical channel. The sonic vibration generated by the sonic vibration generators 32 and 33 causes further cavitation to occur in the slurry so as to disintegrate thoroughly any still remaining rock fraction. The treated slurry is collected in the final container 3 for further mineral recovery and refinery process.

The successive four stages of treatment of the present invention, shown in the above exemplary embodiment, renders the thorough spontaneous disintegration of the ore rock to extremely small physical sizes to less than 1 micron. Such thoroughly disintegrated ore rock facilitates mineral recovery and refinery processes to be carried out with very high efficiency.

The method of the present invention can be carried out readily with various selective successive stages of application of the electrodynamic discharges, hydrostatic agitation, hydrodynamic agitation, and sonic vibrations to disintegrate the ore rock to extremely fine particles heretofore not achievable by crushing it with conventional mechanical or chemical means.

What is claimed is:

1. A continuous method of disintegrating ore rock into fine physical size ore particles suitable for high efficiency mineral recovery and refinery process, comprising:

mixing said ore rock with water to form a slurry;

passing said slurry in a successive sequence in a continuous flow through four treatment operations including in a first stage of exposing said slurry to hydrodynamic impacts to create shock waves and cavitation in the water for disintegrating said ore rock in said slurry into a first smaller physical size rock fraction;

moving said slurry into a second stage and agitating said slurry with hydrostatic energy to cause further cavitation and disintegration of the rock fraction in said slurry;

moving said slurry into a third stage after treated in said second stage while applying hydrodynamic force to create a high speed swirling flow of said slurry to achieve still further cavitation and disintegration of the rock fraction in said slurry; and finally moving said slurry following said third stage into a fourth stage wherein said slurry is exposed to sonic vibrations to induce yet still further cavitation for fully disintegrating said rock fraction into extremely fine physical sizes ore particles and thoroughly dispersed in said slurry.

2. A continuous method of disintegrating ore rock according to claim 1 wherein in said hydrodynamic impacts are electrical discharges imposed in a direction perpendicular to the flow of said slurry into an inverted conical cavity in a circular rotation motion in said first stage.

3. A continuous method of disintegrating ore rock according to claim 2 wherein selective degree of dispersion and ratio of liquid and solid fraction in said slurry in said first stage are obtained by varying the number of electrical discharges imposed on said slurry and to induce varying intensity of said circular rotation motion in said slurry.

4. A continuous method according to claim 3 including applying said hydrostatic energy perpendicular to said slurry flowing through said second stage in a cylindrical cavity in a swirled motion.

5. A continuous method according to claim 4 wherein said hydrostatic energy is provided by at least two hydrostatic cavitation chambers having a plurality of output channels orientated perpendicular to lateral surfaces of said cylindrical cavity.

6. A continuous method according to claim 5 wherein said hydrodynamic force is a swirled flow of water having a strong velocity delivered perpendicular to a radial component of the flow of said slurry in said third stage.

7. A continuous method according to claim 6 wherein said swirled flow of water is delivered by a selective number of water jets.

8. A continuous method according to claim 7 wherein said hydro-sonic vibration are applied in a para-axial zone of the flow of said slurry into a cylindrical channel in said fourth stage.

* * * * *